United States Patent
Sanfridson et al.

(10) Patent No.: US 12,139,144 B2
(45) Date of Patent: Nov. 12, 2024

(54) METHOD FOR A LANE CHANGE OF A PLURALITY OF VEHICLES

(71) Applicant: VOLVO TRUCK CORPORATION, Gothenburg (SE)

(72) Inventors: Martin Sanfridson, Mölndal (SE); Fredrik Sandblom, Mölndal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 197 days.

(21) Appl. No.: 17/594,444

(22) PCT Filed: Apr. 29, 2019

(86) PCT No.: PCT/EP2019/060935
§ 371 (c)(1),
(2) Date: Oct. 15, 2021

(87) PCT Pub. No.: WO2020/221420
PCT Pub. Date: Nov. 5, 2020

(65) Prior Publication Data
US 2022/0185290 A1   Jun. 16, 2022

(51) Int. Cl.
*B60W 30/18* (2012.01)
*B60W 60/00* (2020.01)
(Continued)

(52) U.S. Cl.
CPC .. *B60W 30/18163* (2013.01); *B60W 60/0015* (2020.02); *G05D 1/0293* (2013.01);
(Continued)

(58) Field of Classification Search
None
See application file for complete search history.

(56) References Cited

U.S. PATENT DOCUMENTS

| | | | |
|---|---|---|---|
| 2017/0011633 A1* | 1/2017 | Boegel | B60W 30/18163 |
| 2019/0126927 A1* | 5/2019 | Uejima | G05D 1/0212 |
| 2019/0193738 A1* | 6/2019 | Oh | G08G 1/22 |

FOREIGN PATENT DOCUMENTS

| | | |
|---|---|---|
| DE | 102016216634 A1 | 3/2018 |
| DE | 102017206987 A1 | 10/2018 |

(Continued)

OTHER PUBLICATIONS

Japan Office Action dated Jun. 2, 2023 in corresponding Japan Patent Application No. 2021-564383, 13 pages.
(Continued)

*Primary Examiner* — Fadey S. Jabr
*Assistant Examiner* — Mario C Gonzalez
(74) *Attorney, Agent, or Firm* — Venable LLP; Jeffri A. Kaminski (57) ABSTRACT

The invention relates to a method for a lane change of a plurality of vehicles (1-3) on a multi-lane road, the method comprising—controlling the vehicles to travel in a row in a first lane (L1), with a first of the vehicles (1) in front of a second of the vehicles (2), —thereafter controlling the first vehicle (1) so as to change lane to a second lane (L2) adjacent to the first lane (L1), —thereafter positioning the first vehicle (1) in a first position (P1) in the second lane (L2), and positioning the second vehicle (2) in a second position (P2) in the first lane (L1), the first position (P1) being less advanced in the direction of travel (M) than the second position (P2), and—thereafter controlling the second vehicle (2) so as to change lane to the second lane (L2), and thereby move in front of the first vehicle (1).

11 Claims, 6 Drawing Sheets

(51) Int. Cl.
    *G05D 1/00*     (2024.01)
    *G08G 1/00*     (2006.01)
    *G08G 1/16*     (2006.01)
    *H04W 4/46*     (2018.01)

(52) U.S. Cl.
    CPC ............. *G08G 1/163* (2013.01); *G08G 1/167* (2013.01); *H04W 4/46* (2018.02); *B60W 2300/145* (2013.01); *B60W 2556/50* (2020.02); *B60W 2556/65* (2020.02)

(56) References Cited

FOREIGN PATENT DOCUMENTS

| | | | |
|---|---|---|---|
| JP | 2019028733 A | * | 2/2019 |
| WO | 2018035145 A1 | | 2/2018 |

OTHER PUBLICATIONS

Kevin Stubenrauch: "Comparison of Compensation Mechanisms for Intra-Platoon Position Effects" Jul. 19, 2019 (Jul. 19, 2019), XP055655937, Retrieved from the Internet: URL:https://se2.informatik.uni-wuerzburg.de/publications/download/paper/2028.pdf [retrieved on Jan. 8, 2020] p. 15; figure A.5.

Nycc: "PACELINING", Mar. 31, 2015 (Mar. 31, 2015), XP055655946, Retrieved from the Internet: URL:https://nycc.org/sites/default/files/Lesson%205%20-%20Pacelining.pdf, p. 5.

International Search Report and Written Opinion dated Jan. 20, 2020 in corresponding International PCT Application No. PCT/EP2019/060935, 11 pages.

* cited by examiner

METHOD FOR A LANE CHANGE OF A PLURALITY OF VEHICLES

CROSS-REFERENCE TO RELATED APPLICATIONS

This application is a U.S. National Stage application of PCT/EP2019/060935, filed Apr. 29, 2019, and published on Nov. 5, 2020, as WO 2020/221420 A1, all of which is hereby incorporated by reference in its entirety.

TECHNICAL FIELD

The invention relates to a method for a lane change of a plurality of vehicles on a multi-lane road. The invention also relates to a computer program, a computer readable medium, a control unit or a group of control units, and a vehicle.

The invention can be applied in heavy-duty vehicles, such as trucks and buses. Although the invention will be described with respect to trucks, the invention is not restricted to this particular vehicle, but may also be used in other vehicles such as cars.

BACKGROUND

In platooning, e.g. by means of Cooperative Adaptive Cruise Control (CACC), vehicle convoys may be driven with short distances between the vehicles. Thereby the vehicles form what is herein referred to as a string. To achieve this with a high safety, a control unit of each vehicle receives information from surrounding vehicles over a wireless communication channel, so called Vehicle-to-Vehicle (V2V) communication. For example, such shared information may include brake pressure, engine torque, engine RPM, accelerator pedal position, engine manifold pressure, vehicle speed, radar/lidar data, and/or vehicle capacities.

This information is used in the control to keep the desired distance between each vehicle and the immediately preceding vehicle and to handle events such as hard braking. The V2V communication enables keeping short distances safely since the V2V information is transferred much faster and is more accurate than data from on-board sensors such as radar sensors, laser sensors or cameras.

It is understood that the V2V communication may involve controlling the velocity and/or acceleration of a vehicle in the string in dependence on the signals received from another vehicle in the string. The string may be formed of a row of vehicles, one following another.

Benefits with platooning, e.g. by CACC, include increased fuel efficiency, provided by a reduced air-drag due to short distances between vehicles, and provided by improved vehicle control due to more accurate information about the preceding vehicle.

A further benefit is an improved traffic flow due to the small delay of the V2V data. For example, the traffic flow may be improved by reducing or eliminating the so called rubber-band effect between vehicles. Such an effect may appear due to the delay of a detection by a vehicle of a deceleration of a preceding vehicle, causing a stronger deceleration of the detecting vehicle, upon which a delay of a detection by a following vehicle of the stronger deceleration causing an even stronger deceleration of the following vehicle, and so on. In CACC based control the rubber band effect will be considerably reduced due to the decreased delay, and due to a detecting vehicle being able to take into account signals from vehicles in front of the immediately preceding vehicle.

Yet another benefit with CACC and platooning is an improved driver comfort since CACC allows less aggressive vehicle control compared to systems using on-board sensors exclusively.

Notwithstanding said benefits, there is still room for improvement of known CACC and other platooning strategies. Improvements are needed for controlling platooning vehicles in a lane change maneuver.

US2017011633 describes a vehicle control system for changing the lane of platooning vehicles. The control system controls the platoon vehicles so that the last vehicle of the platoon enters the other lane first, and then the vehicles of the platoon enter the other lane ahead of the last vehicle. However, a problem thereby is that a vehicle, not participating in the platoon, which may have overtaken the last vehicle before its lane change, and may remain in the other lane, next to another platooning vehicle, thereby preventing the other platooning vehicle from changing lane.

SUMMARY

An object of the invention is to facilitate a lane change maneuver of vehicles travelling in a row, for example as platooning vehicles.

The object is reached by a method according to claim 1. Thus, the invention provides a method for a lane change of a plurality of vehicles on a multi-lane road, the method comprising
- controlling the vehicles to travel in a row in a first lane, with a first of the vehicles in front of a second of the vehicles,
- thereafter controlling the first vehicle so as to change lane to a second lane adjacent to the first lane,
- thereafter positioning the first vehicle in a first position in the second lane, and positioning the second vehicle in a second position in the first lane, the first position being less advanced in the direction of travel than the second position, and
- thereafter controlling the second vehicle so as to change lane to the second lane, and thereby move in front of the first vehicle.

Thus, the method provides a lane change process for the vehicles travelling in a row. The vehicles may travel in a row, one after the other. Preferably, there is no vehicle between the first and second vehicles as they are controlled to travel in a row in the first lane. The vehicles may cooperate for the lane change process of the invention. Preferably, controlling the vehicles to travel in a row in the first lane, comprises controlling the vehicles to form a string of platooning vehicles with vehicle-to-vehicle (V2V) communication based control. Thereby, embodiments of the method provides a lane change of a vehicle platoon comprising a plurality of vehicles platooning on a multi-lane road. The vehicles may form a string comprising a plurality of vehicles platooning by means of V2V communication. The string may comprise two, three, or more vehicles. Thus, in some embodiments, the first vehicle may travel in front of one or more vehicles in addition to the second vehicle.

However, alternative embodiments of the method may involve controlling the vehicles to travel in a row in the first lane without V2V communication based control. Thereby, the vehicles may nevertheless cooperate for the lane change process of the invention.

It should be noted that the first and second vehicles preferably comprises means for automatic lateral vehicle control. Such means may for example comprise an adaption of a control unit in each of the first and second vehicles, to control a steering function of the respective vehicle. Such a control may be based on, for example, signals from one or more cameras on the respective vehicle, and a function to determine a lateral position based on, for example, road markings. Thereby, the lane change process may be performed automatically. In some embodiments, the vehicles may be fully autonomous. Such autonomous vehicles may be provided with control units which are arranged to cooperate for the lane change process. The control units may be arranged to communicate by means of V2V communication. However, in other embodiments, the lane change process may be performed by means of human drivers of the vehicles.

The invention comprises positioning the first vehicle in a first position in the second lane, and positioning the second vehicle in a second position in the first lane, the first position being less advanced in the direction of travel than the second position. It should be noted that the first and second positions may be relative positions. Preferably, in the first and second positions, a front end of the first vehicle is, in the direction of travel, behind a rear end of the second vehicle. For reaching the first position, the first vehicle may, after having changed lane, move backwards relative to the second vehicle. The invention allows thus for the first vehicle changing lane first, and the second vehicle then overtaking the first vehicle. In other words, the lane change process may involve the first vehicle pushing backwards relative to the remaining of the cooperating vehicles, which are yet to change lane. This will allow for the creation of an empty area necessary for the second vehicle to make the lane change. In other words, the risk that a vehicle, not participating in the cooperation, is in the second lane, next to the second vehicle, thereby preventing the lane change of the second vehicle, is reduced. This is particularly useful in dense traffic.

In addition, the lane change provides a change of the order of the cooperating vehicles. This is beneficial where there is an agreement, e.g. based on fuel saving ambitions, to alternate the lead vehicle.

The invention provides an advantageous lane change assistance and/or automation. In case of platooning vehicles, lane change process may be programmed as a sequence of steps to form an automatic lane change process of the platoon.

Preferably the method comprises, during the step of controlling the vehicles to travel in a row in the first lane, making a first determination, by means of at least one sensor on the second vehicle, whether it is safe for the first vehicle to change lane to the second lane. Thus, one or more sensors on the second vehicle, may be used to determine whether it is safe for the first vehicle to change lane to the second lane. This is advantageous, since the second vehicle may have a better "view" than the first vehicle, e.g. of non-cooperating vehicles overtaking the platoon in the second lane.

Preferably, data, based on signals from the sensor on the second vehicle, is sent from the second vehicle to the first vehicle, the data being provided for the first determination, or representing a result of the first determination. Thereby, an advantageous information sharing is provided. The vehicles may have V2V communication equipment, allowing them to share the data based on sensor information on surrounding static, or dynamic objects. If the sent data is provided for the first determination, the first vehicle may make the first determination based on the data. If the second vehicle makes, based on the signals from the second vehicle sensor, the first determination, the data sent to the first vehicle may represent the result of the first determination. In some embodiments however, a driver of the second vehicle may, by suitable means, give a signal to a driver of the first vehicle, indicating a result of the first determination.

Preferably, the step of controlling the first vehicle, so as to change lane to the second lane, is made in dependence on the first determination. Thereby, the lane change of the first vehicle may be made in a safe way. In addition, the need for a costly configuration of sensors on the first vehicle, may be avoided. For example, in prior art, a long range rear looking sensor may be needed to spot non-cooperating vehicles approaching from the rear. In the case of a truck, such a rear looking sensor may need to be mounted on a trailer or a semi-trailer, and this is a problem when such units are not sold together with the towing vehicle. The second vehicle sensor, may cover an area in the second lane, where a non-cooperating vehicle, moving at a relatively high speed, can reach the area needed for the first vehicle to change lane.

Preferably, the method comprises making, with the first and second vehicles in the first and second positions, respectively, a second determination, by means of at least one sensor on the first vehicle, whether it is safe for the second vehicle to change lane to the second lane. The second determination may be made by means of one or more sensors on the first vehicle. Thereby, an improvement of known solutions may be provided in that the sensor on the first vehicle, which may be a forward looking sensor, may have a better view of the second lane, than a sensor of the second vehicle.

Preferably, the second determination is made also by means of at least one sensor on the second vehicle. Thereby, the second determination may be made by means of one or more sensors on the second vehicle. Preferably data, based on signals from the sensor on the first vehicle, is sent from the first vehicle to the second vehicle, the data being provided for the second determination, or representing a result of the second determination. Preferably, the step of controlling the second vehicle, so as to change lane to the second lane, is made in dependence on the second determination. The sensor of the first vehicle may be a forward looking sensor. Thereby, a redundant coverage is provided by the first vehicle sensor, and the second vehicle sensor. This will substantially contribute to the second vehicle lane change to be a safe maneuver.

Embodiments of the method may allow for reliably detecting, in a second lane area for the second vehicle lane change, a non-cooperating vehicle driving slower that the cooperating vehicles, or entering the area from a third lane.

Embodiments of the invention may involve more than two vehicles. Thereby, controlling the vehicles to travel in a row in the first lane, may comprise controlling a third of the vehicles to travel behind the second vehicle. The method may thereby comprise, after controlling the second vehicle so as to change lane to the second lane, positioning the first vehicle, or the second vehicle, in a first position in the second lane, and positioning the third vehicle in a second position in the first lane, the first position being less advanced in the direction of travel than the second position. The third vehicle may thereafter be controlled so as to change lane to the second lane, to thereby move in between the first and second vehicles, or in front of the second vehicle Thus, the second vehicle may be positioned in a first position in the second lane, and the third vehicle may be positioned in a second position in the first lane, the first position being less advanced in the direction of travel than the second position, and thereafter, the third vehicle may be controlled so as to change lane to the second lane, and thereby move in front of the second vehicle. Alternatively, the first vehicle may be positioned in a first position in the second lane, and the third vehicle may be positioned in a second position in the first lane, the first position being less advanced in the direction of travel than the second position, and thereafter, the third vehicle may be controlled so as to change lane to the second lane, and thereby move in between the first and second vehicles. For this, the first and second vehicles may be controlled so that there is a distance between the first and second vehicles, to allow the third vehicle to enter in between the first and second vehicles.

Such embodiments may provide an effective and safe changing lane for three or more cooperating vehicles.

An aspect of the invention provides a method for a lane change of a vehicle travelling on a multi-lane road, the method comprising positioning a first vehicle in a first position in a second lane, and positioning a second vehicle in a second position in a first lane adjacent to the second lane, the first position being less advanced in the direction of travel than the second position, making, with the first and second vehicles in the first and second positions, respectively, a determination, by means of at least one sensor on the first vehicle, whether it is safe for the second vehicle to change lane to the second lane, and, controlling, in dependence on the determination, the second vehicle so as to change lane to the second lane, and thereby move in front of the first vehicle.

Thereby, the first vehicle sensor will assist the lane change of the second vehicle, since it may have a better view of the second lane, compared to a sensor of the second vehicle. It should be noted that in such an aspect, it is necessary for the first vehicle to have reached the second lane with a lane change from the first lane. Even if the first vehicle reached the second lane by changing from the first lane, it is not necessary for the first vehicle to have been ahead of the second vehicle in the first lane. The first vehicle could have been behind the second vehicle in the first lane, before changing to the second lane.

Preferably, the determination is made also by means of at least one sensor on the second vehicle. Thereby, with the first and second vehicles in the first and second positions, respectively, the determination is made, by means of the sensors on the first and second vehicles, whereby a sensor redundancy is provided.

The object is also reached with a computer program, a computer readable medium, a control unit or a group of control units, or a vehicle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
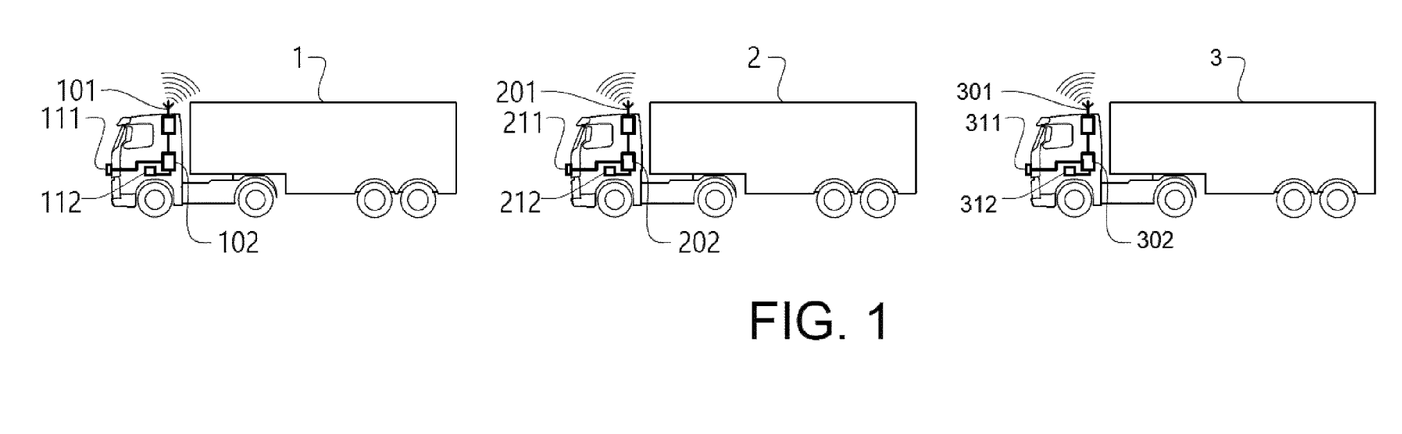
FIG. 1 is a side view of vehicles in a string of platooning vehicles.
Figure 2:
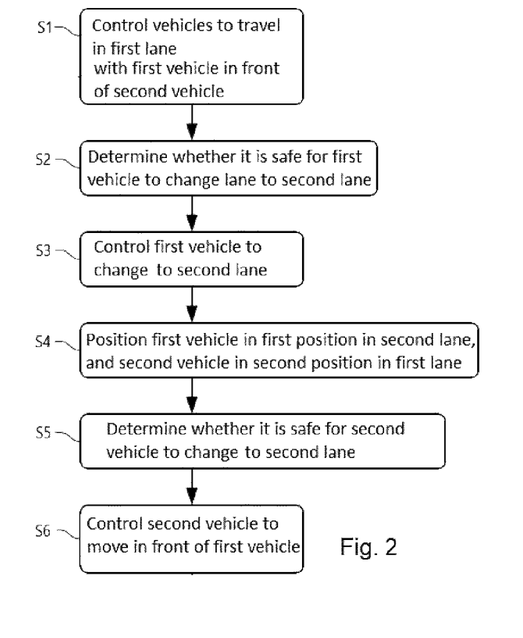
FIG. 2 is a diagram depicting steps in a method for a lane change of the vehicles in FIG. 1, according to an embodiment of the invention.

FIG. 1 shows what is herein referred to as a first vehicle 1, a second vehicle 2, and a third vehicle 3. In this example, the vehicles 1, 2, 3 are trucks with semitrailers. However, the invention is equally applicable to other types of vehicles, such as cars, and buses.

Each of the vehicles 1, 2, 3 comprises equipment 101, 201, 301 for platooning, more specifically for Cooperative Adaptive Cruise Control (CACC). The CACC equipment includes equipment for so called Vehicle-to-Vehicle (V2V) communication. The V2V communication equipment includes means for wireless communication with a radio transmitter and a radio receiver for the V2V communication, and a data communication processing device which is arranged to communicate with a control unit 102, 202, 303 of a respective vehicle control system. The wireless communication could be based on any other suitable industry standard format, such as WiFi, radio modem, or Zigbee. This wireless communication could alternatively be based on a non-industry-standard format.

By means of this equipment for CACC, each of the vehicles 1, 2, 3 is adapted to transmit signals representative of the dimensions, velocity and acceleration of the respective vehicle to other vehicles comprising equipment for CACC. Further, each of the vehicles 1, 2, 3 is adapted to receive signals representative of the dimensions, velocity and acceleration of other vehicles comprising equipment for CACC, and to control the velocity and acceleration of the respective vehicle based on the received signals.

The vehicles 1, 2, 3 form parts of a string comprising a plurality of vehicles platooning by means of the V2V communication. Each vehicle, except a vehicle at the front of the string, in this example the first vehicle 1, is a receiving vehicle controlled to be at a relatively short distance from a transmitting vehicle immediately in front of the respective receiving vehicle.

It should be noted that the invention is applicable also to strings made up of less, or more than three vehicles. The invention is equally applicable to strings made up of two vehicles.

The vehicle control system of the respective receiving vehicle controls brakes and a drivetrain of the receiving vehicle based on the wireless signals received from the respective transmitting vehicle.

It should be noted that in some embodiments, the vehicle control system of the respective receiving vehicle may control brakes and a drivetrain of the receiving vehicle based on the wireless signals received from a vehicle in front of the vehicle immediately in front of the respective receiving vehicle, e.g. from the vehicle at the front of the string, as an alternative to or in addition to wireless signals received from the vehicle immediately in front of the respective receiving vehicle.

The vehicles 1, 2, 3 preferably comprises means for automatic lateral vehicle control. Such means may for example comprise an adaption of a control unit, exemplified below, in each of the vehicles, to control a steering function of the respective vehicle. Such a control may be based on, for example, signals from one or more cameras on the respective vehicle 1, 2, 3, and a function to determine a lateral position based on, for example, road markings.

Each vehicle 1, 2, 3 comprises a forward sensor 111, 211, 311 in the form of a radar sensor. The forward sensor 111, 211, 311 is arranged to detect objects in front of the respective vehicle 1, 2, 3. By means of the forward sensor 111, 211, 311 the distance to, velocity of and acceleration of a vehicle in front of the respective vehicle may be determined. The forward sensor 111, 211, 311 provides means in addition to the CACC equipment for controlling the respective vehicle in relation to other vehicles.

Each vehicle 1, 2, 3 further comprises two sideways sensors 112, 212, 312, only one of which is shown in FIG. 1. The sideways sensors 112, 212, 312 are provided in the form of a radar sensors. The sideways sensors 112, 212, 312 are arranged to detect objects on a respective of the left and right side of the respective vehicle.

The respective control unit 102, 202, 303 is arranged to receive signals from the respective sensors 111, 112, 211, 212, 311, 312. In alternative embodiments, the sensors 111, 112, 211, 212, 311, 312 could be LIDAR sensors or cameras. In further alternatives, there could be a plurality of sensor types for detecting objects around the vehicles. For example, any of the vehicles could be provided with two or more forward sensors. Thereby, one of the forward sensors could be a radar sensor, and another forward sensor could be a camera. In a further example, any of the vehicles could be provided with four or more sideways sensors. Thereby, for each of the right side and the left side of the vehicle, one of the sideways sensors could be a radar sensor, and another sideways sensor could be a camera.

With reference to FIG. 2 and FIG. 3a-3f, a method for a lane change of the platoon in FIG. 1, according to an embodiment of the invention will be described.

Figure 3A:
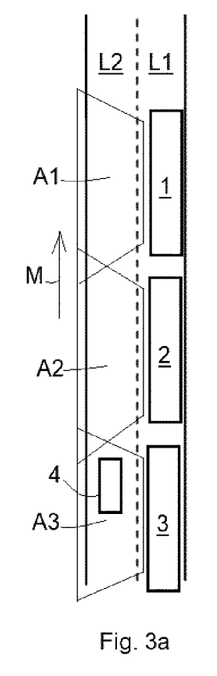
FIG. 3a-FIG. 3f are top views of the vehicles in FIG. 1, showing vehicle positions in during the execution of the method in FIG. 2.

The method comprises controlling S1 the platooning vehicles 1, 2, 3 to travel in a first lane L1, as depicted in FIG. 3a. The direction of movement, or travel, of the vehicles is indicated with an arrow M. Thereby the first vehicle 1 is in front of the second vehicle 2.

A first determination is made S2. It is determined whether it is safe for the first vehicle 1 to change lane to a second lane L2. The second lane L2 is adjacent to the first lane L1. In this example, the second lane L2 is to the left of the first lane L1, as seen in the direction of travel of the vehicles.

The first determination is made by means of one of the sideways sensors 112, 212, 312 on each of the vehicles 1, 2, 3. Further, data, based on signals from the sideways sensor 212 on the second vehicle 2, is sent from the second vehicle to the first vehicle 1. Also, data, based on signals from the sideways sensor 312 on the third vehicle 3, is sent from the third vehicle to the first vehicle 1. The data is sent by means of the V2V communication equipment. The data sent represents the sensor signals. The data is provided for the first determination S2.

It should be noted that the first determination S2 may be based on signals from further sensors, such as rearward facing sensor on one or more of the vehicles.

It is determined S2 that it is safe for the first vehicle to change lane, if the signals from the sensors indicate that there are no obstacles in the second lane, e.g. in the form of one or more vehicles 4, in an area covered by the sensors. As indicated in FIG. 3a, in this embodiment, the sideways sensor 112, 212, 312 of each vehicle covers an area A1-A3 including a stretch of the second lane L2 which extends along the length of the vehicle. Thereby, the total area covered by the sensors includes a stretch of the second lane which extends along the entire length of the vehicle string, covered by the sideways sensors 112, 212, 312.

Figure 3B:
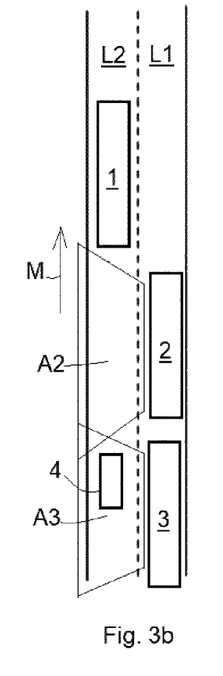

If it is determined S2 that it is safe for the first vehicle to change lane, the first vehicle 1 is controlled S3 so as to change lane to the second lane L2, as depicted in FIG. 3b. Thus, this lane change is made in dependence on the first determination. The lane change of the first vehicle may be performed by means of an automatic control of the first vehicle wheel steering, based on sensor signals indicating the relative positions of road markings, etc., as is known per se, and will not be described closer here.

Figure 3C:
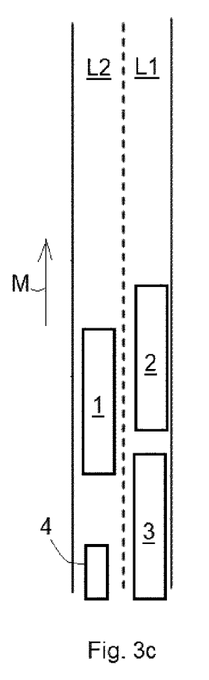
Figure 3D:
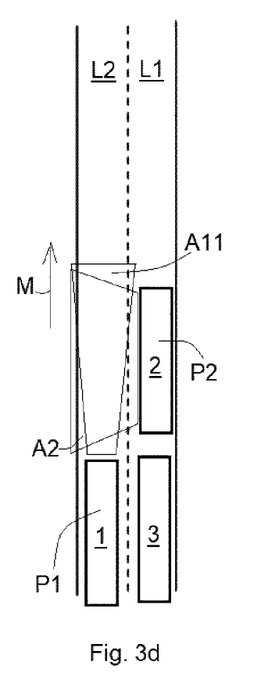

As depicted in FIG. 3c and FIG. 3d, after having changed lane, the first vehicle 1 is moves backwards relative to the other vehicles. Thereby, the first vehicle 1 ends up being positioned S4 in a first position P1 in relation to the second vehicle 2. Further the second vehicle 2 is thereby in a second position P2 in relation to the first vehicle 1. The first position P1 is less advanced in the direction of travel M than the second position P2.

Preferably, the first vehicle 1 does not, in the first position P1, overlap, in the direction of travel M, the second vehicle. Preferably, the first vehicle is in the first position P1 at a relatively short distance from the second vehicle. For example, in the first and second positions P1, P2 of the first and second vehicles, respectively, there is, in the direction of travel M, a separation time gap between the first and second vehicles 1, 2 of less than 1.5 seconds, preferably less than 1 second. However, the distance may in some embodiments be larger. The separation time gap is understood as the time between the passing of a rear end of the second vehicle 2, to the time of passing of a front end of the first vehicle 1. Thereby, it may be secured that a stretch of the second lane L2 is free for the second vehicle to move to the second lane L2.

Preferably, in the first position P1 of the first vehicle 1, there is, in the direction of travel M of the vehicles, at least a partial overlap between the first vehicle 1 and the third vehicle 3. Thereby, the third vehicle 3 may prevent any further vehicle from overtaking the first vehicle 1, in the first lane L1, and then moving to the second lane L2, in front of the first vehicle.

As exemplified in FIG. 3d, in the first position P1, the forward sensor 111 (FIG. 1) of the first vehicle 1 covers an area A11, which includes a stretch of the second lane which is next to the second vehicle 2. A second determination is made S5, by means of the first vehicle forward sensor 111, whether it is safe for the second vehicle 2 to change lane to the second lane L2. Data, being based on, e.g. representing, signals from the first vehicle forward sensor 111, is sent from the first vehicle 1 to the second vehicle 2. The data is sent by means of the V2V communication equipment.

The second determination S5 is made also by means of the sideways sensor 212 (FIG. 1) of the second vehicle 2. The second vehicle sideways sensor 212 covers an area A2 including a stretch of the second lane L2 which extends along the length of the second vehicle 2. Thereby, a redundant coverage is provided by the first vehicle forward sensor 111, and the second vehicle sideways sensor 212. Based on the data being based on signals from the first vehicle forward sensor 111, and the signals from the second vehicle sideways sensor 212, the second vehicle makes the determination S5, whether it is safe for the second vehicle 2 to change lane to the second lane L2.

If it is determined S5 that it is safe for the second vehicle 2 to change lane to the second lane L2, the second vehicle 2 is controlled S6 so as to change lane to the second lane L2, and thereby move in front of the first vehicle 1.

Figure 3E:
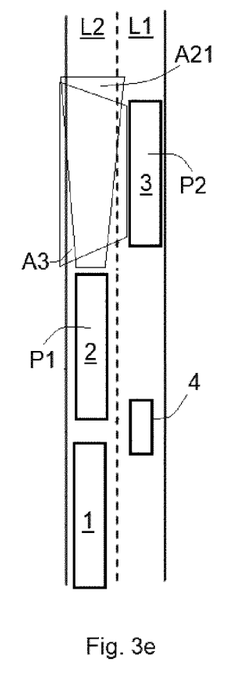

As depicted in FIG. 3e, similarly to what has been described above, after the lane change of the second vehicle 2, the first and second vehicles 1, 2 move backwards relative to the third vehicle 3. Thereby, the second vehicle 2 ends up being positioned in a first position P1 in relation to the third vehicle 3. Further, the third vehicle 3 is thereby in a second position P2 in relation to the second vehicle 2. The first position P1 is less advanced in the direction of travel M than the second position P2. Thereby, it may be secured that a stretch of the second lane L2 is free for the third vehicle 3 to move to the second lane L2.

As exemplified in FIG. 3e, similarly to what has been described above, in the first position P1, the forward sensor 211 (FIG. 1) of the second vehicle 2 covers an area A21, which includes a stretch of the second lane L2 which is next to the third vehicle 3. A determination is made, by means of the second vehicle forward sensor 211, whether it is safe for the third vehicle 3 to change lane to the second lane L2. The determination is made also by means of the sideways sensor 312 (FIG. 1) of the third vehicle 3. The third vehicle sideways sensor 312 covers an area A3 including a stretch of the second lane L2 which extends along the length of the third vehicle 3. Thereby, a redundant coverage is provided by the second vehicle forward sensor 211, and the third vehicle sideways sensor 312.

Figure 3F:
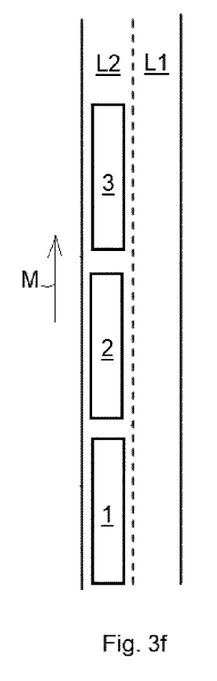

As depicted in FIG. 3f, if it is determined that it is safe for the third vehicle 3 to change lane to the second lane L2, the third vehicle 3 is controlled so as to change lane to the second lane L2, and thereby move in front of the second vehicle 2.

Thereby, all vehicles 1-3 have changed lane. The last vehicle 3 before the lane change becomes the first vehicle after the lane change.

It should be noted that alternatives to the process described above with reference to FIG. 1-FIG. 3 are possible, For example, once the second vehicle 3 has changed lane, the third vehicle 3 can change lane so as to move in between the first and second vehicles 1, 2. Thereby, for the third vehicle lane change, the determination, whether it is safe for the third vehicle 3 to change lane to the second lane L2, may be made by means of the first vehicle forward sensor 111.

Figure 4:
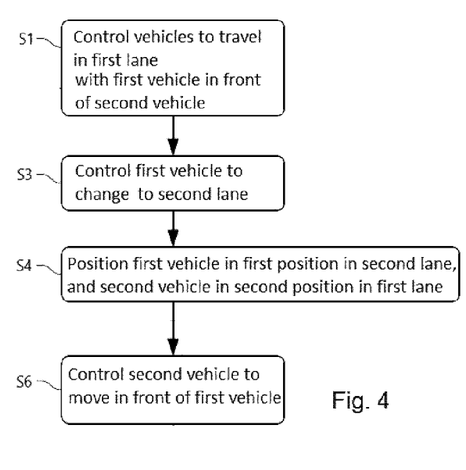
FIG. 4 is a diagram depicting steps in a method for a lane change of the vehicles in FIG. 1, according to a more general embodiment of the invention.

FIG. 4 depicts steps in a more general embodiment of the invention. In a method for a lane change of a plurality of vehicles on a multi-lane road, the following steps are performed: The vehicles are controlled S1 to travel in a row in a first lane, with a first of the vehicles in front of a second of the vehicles. Thereafter, the first vehicle is controlled S3 so as to change lane to a second lane adjacent to the first lane. Thereafter, the first vehicle is positioned S4 in a first position in the second lane, and the second vehicle is positioned in a second position in the first lane, the first position being less advanced in the direction of travel M than the second position. Thereafter, the second vehicle is controlled S6 so as to change lane to the second lane, and thereby move in front of the first vehicle.

It is to be understood that the present invention is not limited to the embodiments described above and illustrated in the drawings; rather, the skilled person will recognize that many changes and modifications may be made within the scope of the appended claims.

The invention claimed is:

1. A method for a lane change of a plurality of vehicles on a multi-lane road, the method comprising:
controlling the vehicles to travel in a row in a first lane, with a first of the vehicles in front of a second of the vehicles, and the second vehicle in front of a third of the vehicles,
thereafter controlling the first vehicle so as to change lane to a second lane adjacent to the first lane,
thereafter positioning the first vehicle in a first position in the second lane, and positioning the second vehicle in a second position in the first lane, the first position being less advanced in the direction of travel than the second position, and
thereafter controlling the second vehicle so as to change lane to the second lane, and thereby move in front of the first vehicle, wherein controlling the vehicles to travel in a row in the first lane, comprises controlling the vehicles to form a string of platooning vehicles with vehicle-to-vehicle communication based control, and during the step of controlling the vehicles to travel in a row in the first lane, making a first determination, by means of at least one sensor on the second vehicle, whether it is safe for the first vehicle to change lane to the second lane, and in that the step of controlling the first vehicle, so as to change lane to the second lane, is made in dependence on the first determination, and wherein, in the first position of the first vehicle, before controlling the second vehicle so as to change lane to the second lane, there is, in the direction of travel of the vehicles, at least a partial overlap between the first vehicle and the third vehicle.

2. A method according to claim 1, characterized in that data, based on signals from the sensor on the second vehicle, is sent from the second vehicle to the first vehicle, the data being provided for the first determination, or representing a result of the first determination.

3. A method according to claim 1, characterized by making, with the first and second vehicles in the first and second positions, respectively, a second determination, by means of at least one sensor on the first vehicle, whether it is safe for the second vehicle to change lane to the second lane.

4. A method according to claim 3, characterized in that the second determination is made also by means of at least one sensor on the second vehicle.

5. A method according to claim 3, characterized in that data, based on signals from the sensor on the first vehicle, is sent from the first vehicle to the second vehicle, the data being provided for the second determination, or representing a result of the second determination.

6. A method according to claim 3, characterized in that the step of controlling the second vehicle, so as to change lane to the second lane, is made in dependence on the second determination.

7. A method according to claim 1, characterized in that controlling the vehicles to travel in a row in the first lane, comprises controlling a third of the vehicles to travel behind the second vehicle, the method comprising, after controlling the second vehicle so as to change lane to the second lane, positioning the first vehicle, or the second vehicle, in a first position in the second lane, and positioning the third vehicle in a second position in the first lane, the first position being less advanced in the direction of travel than the second position, and, thereafter, controlling the third vehicle so as to change lane to the second lane, to thereby move in between the first and second vehicles, or in front of the second vehicle.

8. A method according to claim 1, characterized in that the determination is made also by means of at least one sensor on the second vehicle.

9. A non-transitory computer readable medium storing a computer program comprising program code for performing the steps of claim 1 when said program code is run on a computer.

10. A control unit or a group of control units configured to perform the steps of the method according to claim 1.

11. A vehicle comprising a control unit according to claim 10.

* * * * *